United States Patent Office
3,565,937
Patented Feb. 23, 1971

3,565,937
METHOD FOR PREPARING MERCAPTOALKYL ORGANOSILANES
Abe Berger, Schenectady, N.Y., assignor to General Electric Company, a corporation of New York
No Drawing. Filed Jan. 6, 1969, Ser. No. 789,418
Int. Cl. C07f 7/02, 7/22
U.S. Cl. 260—448.8
4 Claims

ABSTRACT OF THE DISCLOSURE

A method for preparing mercaptoalkyl organosilanes, having a range of substituents other than the mercaptoalkyl group, employing the addition of a silicon hydride group across the double bond of an olefinically unsaturated compound.

BACKGROUND OF THE INVENTION

Related applications

The process of the present invention is related to the process described and claimed in the copending application of Abe Berger, Ser. No. 789,396, filed of even date herewith and to the copending application of Abe Berger, Ser. No. 789,401, filed of even date herewith, both applications being assigned to the same assignee as the present invention.

This invention is also related to the invention described and claimed in the copending application of Abe Berger, Ser. No. 796,633, filed of even date herewith.

Various methods have been proposed for the preparation of mercaptoalkyl substituted organosilanes. For example, German Pat. No. 1,163,818 describes the reaction of a haloalkyl substituted silane with thiourea in ethanol, followed by the decomposition of the isothiouronium salt with ammonia to form the mercaptoalkyl substituent. This process is, however, subject to some difficulties because of the unavailability of the starting materials, the fact that the initial reaction must be run in ethanol, and the lower yields of product experienced.

Other processes utilize the anti-Markownikoff addition of hydrogen sulfide to olefinic silanes. However, the mercaptoalkyl group formed according to this reaction can compete for additional olefinic silanes during the reaction and an excess of hydrogen sulfide, in liquid form, must be employed to prevent the competing reaction. The difficulty of handling and storing this excess reactant material is, of course, obvious.

Of course, various other methods are known to the prior art but, in general, each requires the use of relatively expensive reaction components, or is carried out under such conditions that the formation of a mercaptoalkyl substituted silane with other functional substituents is not possible.

In the past, it has been impossible to form these materials by the direct addition of a silicon hydride group across the double bond of an olefinic unsaturation, due to the poisoning of the platinum catalyst by the mercaptan group. Thus, attempts at such a reaction resulted, in the main, in the regeneration of the starting materials.

SUMMARY OF THE INVENTION

According to the present invention, a method has been found for the preparation of mercaptoalkyl substituted organosilanes through the addition of a silicon hydride group across the double bond of an olefinic unsaturation. The process of the present invention is accomplished by protecting the mercapto substituent during the course of the reaction with a group inert to the platinum during the course of reaction.

The various platinum compounds previously employed in the art can be used with equal facility according to the present invention. Generically, the reaction can be represented by the following equations:

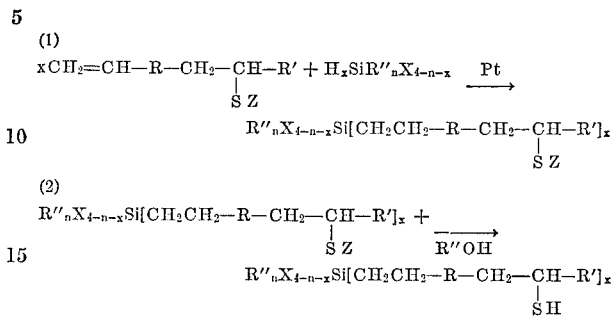

where $x$ is from 1 to 2; $n$ is from 1 to 3; the total of $x$ and $n$ is a maximum of 3; R is a divalent, saturated alkyl group, R' is selected from the class consisting of monovalent, saturated alkyl groups and hydrogen, the total number of carbon atoms in R and R', combined, being from 0 to 20, R'' is selected from the class consisting of alkyl and haloalkyl radicals of not more than 18 carbon atoms, Z is selected from the class consisting of —SiR''$_3$, —SnR''$_3$, $$-\overset{O}{\underset{\|}{C}}-R'''$$

where R''' is a hydrocarbon radical of from 1 to 15 carbon atoms, preferably an alkyl radical of from 1 to 3 carbon atoms, X is selected from the class consisting of chloride, bromide, iodide, and lower ($C_1$–$C_4$) alkoxy radicals. When the group blocking the sulfur atom in the product of Equation 1 is the thioacid radical, it is preferable to employ a non-protonic base, in conjunction with the alcohol, in the reaction of Equation 2. Under these circumstances, if the X substituent is a halide, then this halide is converted to an alkoxy group, corresponding to the alcohol employed, as the thioacid substituent is removed and the mercaptan group formed.

The sulfur substituted compound employed in Equation 1 is easily formed employing free radical catalysts in the reaction of a non-conjugated diolefin with a thioacid. When the sulfur substituent of the reaction in Equation 1 is to be blocked with a trialkyl or trialkoxy silyl or trialkyl stannyl group, a mercapto substituted olefin is treated with a trialkyl or trialkoxy halosilane or the corresponding tin compound.

As previously mentioned, the addition of the silicon hydride group across the double bond of the olefin is accomplished employing the standard conditions generally employed for such addition reactions. The platinum catalysts can be any of those generally used to catalyze such reactions.

In the reaction according to Equation 2, where the sulfur blocking group is removed and the mercaptan group formed, the alcohol is added and the mixture is refluxed to remove the esters and alcohols. The final product can then be purified by fractional distillation.

BRIEF DESCRIPTION OF THE PREFERRED EMBODIMENTS

The route for preparation of the sulfur-substituted olefins wherein a blocking group is placed on the sulfur to prevent catalyst poisoning during the silicon hydrogen-olefin addition is prepared differently, depending upon the blocking group employed. When the blocking group is to be the radical of a thioacid, a non-conjugated diolefin is reacted with the thioacid, in the presence of a free radical initiator, according to the reaction:

(3)
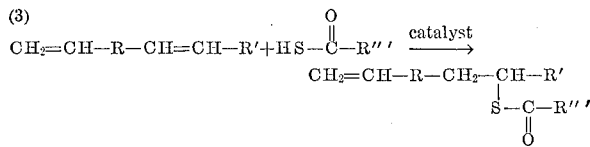

where R, R', and R''' are as previously defined. The free radical initiators employed as catalysts can be any of those normally used such as ultraviolet light, heat, or various azo materials. The reaction is carried out in the absence of a solvent and at a temperature from room temperature to 130° C. The reaction time can vary from 1 to 5 hours, depending upon the catalyst employed. In this reaction, the diolefinic material is preferably added to the thioacid in order to avoid polymerization of the diolefin.

When the blocking group on the sulfur is to be one of the groups $-SiR''_3$ or $-SnR''_3$, a monounsaturated mercapto olefin is employed. Such materials are available and are reacted with a haloorganosilane or haloorgno tin compound according to the following reaction:

(4)
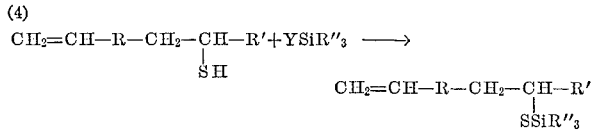

or (4a)
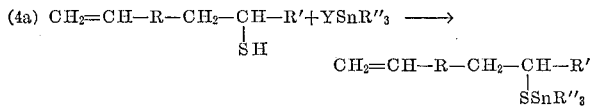

where R, R', and R'' are as previously defined, and Y is a halide selected from the group consisting of chloride, bromide, and iodide.

The reaction of the haloorganosilane, according to Equation 4, is carried out in the presence of a tertiary amine or sodium metal in a high boiling hydrocarbon solvent. The boiling point of the hydrocarbon solvent employed must be such as to allow separation from the product by distilling the product from the hydrocarbon solvent. The sodium is suspended in the hydrocarbon solvent and the mercaptan is first added. Following reaction in sufficient solvent to form a sodium salt, the haloorganosilane is added, dropwise, and the resulting reaction is almost instantaneous. A tertiary amine is employed in a ratio of 1:1:1 with the mercaptan and haloorganosilane. The sodium is also employed in an essentially 1:1 ratio with the mercaptan. The reaction, employing the haloorgano tin compound is essentially the same. In both of the reactions, the sodium is added at room temperature, while the haloorganosilane or haloorgano tin additions are preferably carried out at from about 80 to 120° C. Tertiary amines which can be employed are pyridine, picoline, 1,4-diazabicyclo(2,2,2)octane, and the dialkyl analines.

In order to prevent poisoning of the catalyst during the silicon hydrogen addition, the material formed according to any of the reactions described in Equation 3, 4, and 4a should be purified at this stage. Purification by fractionation is sufficient to allow proceeding with the reaction of Equation 1.

The addition of the silicon hydride across the double bond of the olefin is accomplished in the absence of a solvent employing, preferably, stoichiometric ratios of the two materials. A slight excess of the olefinic material can be employed, and the olefin is preferably added to the silicon hydride. The reaction can be accomplished at a temperature from room temperature to 130° C. and requires approximately 1 to 5 hours.

The catalysts employed for this reaction are any of the standard catalysts employed for the addition of the SiH materials to olefinic materials and include elemental platinum, as shown in U.S. Pat. No. 2,970,150—Bailey and platinum-on-charcoal, platinum-on-gamma-alumina, platinum-on-silica gel, platinum-on-asbestos, and chloroplatinic acid ($H_2PtCl_6 \cdot 6H_2O$), as mentioned in U.S. Pat. No. 2,823,218—Speier. Further, the platinum-containing material can be selected from those having the formula $(PtCl_2 \cdot olefin)_2$ and $H(PtCl_3 \cdot olefin)$, as described in U.S. Pat. No. 3,159,601—Ashby. The olefin shown in the previous two formulas can be almost any type of olefin, but is preferably an alkene having from 2 to 8 carbon atoms, a cycloalkene having from 5 to 7 carbon atoms, or styrene. Specific olefins utilizable in the above formulas are ethylene, propylene, the various isomers of butylene, octylene, cyclopentene, cyclohexene, cycloheptene, etc. A further platinum-containing material usable in the composition of the present invention is the platinum chloride-cyclopropane complex $(PtCl_2 \cdot C_3H_6)_2$ described in U.S. Pat. No. 3,159,662—Ashby.

Still further, the platinum-containing material can be a complex formed from chloroplatinic acid with up to 2 moles per gram-atom of platinum of a member selected from the class consisting of alcohols having the formula AOH, ethers having the formula AOA', aldehydes having the formula ACHO and mixtures of the above as described in U.S. Pat. No. 3,220,972—Lamoreaux. The substituent A in the above formulas is a member selected from the class consisting of alkyl radicals having at least 4 carbon atoms, alkyl radicals substituted with an aromatic hydrocarbon radical, and alkyl radicals substituted with an OA' group, where A' is a member selected from the class consisting of monovalent hydrocarbon radicals free of aliphatic unsaturation and monovalent radicals free of aliphatic unsaturation and consisting of carbon, hydrogen, and oxygen atoms, with each oxygen atom being attached to two atoms, at least one of which is a carbon atom and up to one of which is a hydrogen atom. The amount of platinum catalyst to be employed is well known in the art as the standard amounts for employment in similar silicon hydrogenolefin addition reactions.

In the reaction according to Equation 2, the alcohol is preferably employed in an excess of about 100%. If an alkoxy-substituted organosilicon compound is to be treated in Equation 2, then the alcohol should have the same alkyl group as the alkoxy substituent. The order of addition of the reactants in this equation is not critical and the reaction is generally carried out under atmospheric pressure at reflux temperature. About 2 to 3 hours is required for the reaction and the by-products are separated during the distillation.

If a base is employed, it should be a non-protonic base, and preferably the sodium alkoxide corresponding to the alcohol which is used. As mentioned previously, if halide substituents are present on the silicon atom of the compound to be treated, and a base is employed, then these halide substituents will be converted to alkoxy groups. Thus, in calculating the necessary amount of alcohol to employ, the amount necessary for conversion of these groups must also be included.

The process of the present invention is especially versatile, particularly as no silicon-substituted olefin compound is necessary, i.e., a compound in which the silicon substituent is employed in a manner other than as a blocking group. If the organosilicon hydride is added before the mercaptan group is protected by the blocking group, no reaction will occur. On the other hand, when the sulfur group is added to the diolefin first, there is no isomerization though the sulfur group will add to an internal double bond, if such a double bond is present.

The following examples are illustrative of the practice of the present invention and should not be considered as limiting in any way the full scope of the invention as

EXAMPLE 1

Preparation of 7-octenyl thioacetate

A reaction mixture was prepared containing 220.4 parts of 1,7-octadiene and 76.1 parts of thioacetic acid. The mixture was irradiated with ultraviolet light for about 4 hours at 25° C. A vapor phase chromatography scan was run of the resulting product and indicated the desired conversion to the 7-octenyl thioacetate. The reaction mixture was then fractionated and the product collected at 61° C. and 0.2 mm. pressure at a yield of 57%. An infrared spectrum of the product was consistent with the proposed structure:

(5)  $$CH_2=CH(CH_2)_5CH_2S\overset{O}{\overset{\|}{C}}-CH_3$$

A further vapor phase chromatography scan of the product indicated that it was essentially pure.

EXAMPLE 2

Addition of organosilicon hydride to 7-octenyl thioacetate

A quantity of 50 parts of the 7-octenyl thioacetate, prepared according to Example 1, and 0.05 part of metallic platinum were placed in a reaction vessel and mechanically stirred. Over the course of 2 hours, 25.4 parts of dimethylchlorosilane were added to the mixture which was then heated to 90° C. and kept at this temperature for about 48 hours. The reaction mixture was then fractionated and the product collected at 120° C. and 0.2 mm. pressure in a yield of 60°. A vapor phase chromatography scan indicated that the product was essentially pure.

EXAMPLE 3

Formation of omega-dimethylethoxysilyl-n-octyl mercaptan

A reaction system was prepared including a reaction vessel, stirrer, fractionation equipment, and thermometer. A quantity of 84.3 parts of dimethylchlorosilyl-n-octyl-thioacetate and 200 parts of ethanol were placed into the reaction vessel. Subsequently, 1 part of sodium ethoxide was added and the reaction mixture was brought to reflux so that ethyl acetate and ethanol were continuously removed. When all the low boilers had been distilled off, the reaction mixture was distilled at reduced pressure and the product, boiling at 96° C. and 0.08 mm. was obtained in a yield of approximately 92%. An infrared scan showed the absence of the carbon peak at 5.9 microns, which peak had been present in the starting material. The product was thus consistent with the desired structure:

(6)  $(CH_3)_2(C_2H_5O)Si(CH_2)_8SH$

EXAMPLE 4

A reaction is carried out in the same manner as in Example 2, but employing 21.9 parts of methylchlorosilane. The product is fractionated and then treated with alcohol and sodium ethoxide, in the same manner as in Example 3. The resulting product has the structure:

(7)  $CH_3(C_2H_5O)Si[(CH_2)_8SH]_2$

EXAMPLE 5

Stoichiometrically equivalent quantities of 5-hexenyl mercaptan and trimethylchlorosilane are reacted in the presence of a stoichiometrically equivalent quantity of pyridine suspended in decane. After heating at about 100° C. for 2 hours, the reaction mixture is fractionated to yield a product having the formula:

(8)  $CH_2=CH(CH_2)_4SSi(CH_3)_3$

This product is then treated with a stoichiometrically equivalent quantity of chloromethyldipropoxysilane in the presence of catalytic quantities of platinum-on-charcoal. The reaction mixture is fractionally distilled to yield a product having the formula:

(9)  $ClCH_2(C_3H_8O)_2Si(CH_2)_6SSi(CH_3)_3$

This product is then treated with a quantity of propanol equivalent to twice the stoichiometric ratio of propanol to the sulfur substituent. The resulting product has the formula:

(10)  $ClCH_2(C_3H_8O)_2Si(CH_2)_6SH$

The following reaction is carried out employing stoichiometrically equivalent quantities of the noted materials:

(11)
$$CH_2=CH(CH_2)_2CH=CHCH_3 + C_3H_8\overset{O}{\overset{\|}{C}}SH \longrightarrow$$
$$CH_2=CH(CH_2)_2CH_2-\overset{}{\underset{\underset{O}{\overset{\|}{S-C_3H_8}}}{C}}CH_3$$

The product produced according to the reaction of Equation 11 is then treated, sequentially, in the manner of Examples 2 and 3, with methyldichlorosilane, fractionated, and then treated with butanol and sodium butoxide, to yield the product:

(12)  $CH_3(C_4H_9O)_2Si(CH_2)_5\underset{SH}{\overset{}{C}}CH_3$

A versatile process for the formation of organosilicon compounds substituted with mercaptoalkyl groups has thus been shown where the method of forming these compounds includes the reaction between an organosilicon hydride and an olefinically unsaturated material having a sulfur substituent with a blocking group. The blocking group is removed, following formation of the remainder of the desired compound, to yield the mercapto substituent.

The products produced according to the method of this invention are useful in the formation of organopolysiloxanes, as by silicon hydride-SiOH additions, as are known in the art. Such products have known utility, as, for example, metal protectants, as disclosed and claimed in U.S. Pat. No. 3,346,405 of R. V. Viventi, assigned to the same assignee as the present invention.

I claim:

1. A method for forming:

$$R''_nX_{4-n-x}Si[CH_2CH_2-R-CH_2-\underset{SH}{\overset{}{CH}}-R']_x$$

comprising the addition of an organosilicon hydride of formula:

$$H_xSiR''_nX_{4-n-x}$$

to an olefinically unsaturated sulfur-substituted material of formula:

$$CH_2=CH-R-CH_2-\underset{SZ}{\overset{}{CH}}-R'$$

in the presence of a platinum catalyst and reacting an alkanol of formula R"OH with the reaction product wherein $x$ is from 1 to 2, $n$ is from 1 to 3, the total of $x$ and $n$ is a maximum of 3; R is a divalent saturated alkyl radical, R' is selected from the group consisting of monovalent saturated alkyl groups, and hydrogen, the total number of carbon atoms in R and R', combined, being from 0 to 20, R" is selected from the class consisting of alkyl groups, haloalkyl groups, and lower alkoxy groups; Z is selected from the class consisting of —SiR"$_3$, —SnR"$_3$, and $$-\overset{O}{\overset{\|}{C}}-R'''$$

where R''' is a hydrocarbon radical, free of aliphatic unsaturation, having up to 15 carbon atoms; and X is selected from the class consisting of chloride, bromide, iodide, and lower alkoxy groups.

2. The method of claim 1 wherein the platinum catalyst is selected from the class consisting of platinum, platinum-on-charcoal, platinum-on-gamma-alumina, platinum-on-silica gel, platinum-on-asbestos, chloroplatinic acid, $(PtCl_2 \cdot olefin)_2$ and $H(PtCl_3 \cdot olefin)$, and complexes formed from chloroplatinic acid with up to 2 moles per gram-atom of platinum of a member selected from the class consisting of alcohols having the formula AOH, ethers having the formula AOA′, aldehydes having the formula ACHO, and mixtures of these alcohols, ethers and aldehydes, where A is a member selected from the class consisting of alkyl radicals having at least 4 carbon atoms, alkyl radicals substituted with an OA′ group, where A′ is a member selected from the class consisting of monovalent hydrocarbons free of aliphatic unsaturation and monovalent radicals free of aliphatic unsaturation and consisting of carbon, hydrogen, and oxygen atoms, with each oxygen atom being attached to 2 atoms, at least one of which is a carbon atom and up to one of which is a hydrogen atom.

3. The method of claim 1 where Z is

4. A method for producing:

$$(CH_3)_2(C_2H_5O)Si(CH_2)_8SH$$

comprising adding dimethylchlorosilane to 7-octenyl thioacetate and reacting this product with ethanol in the presence of sodium ethoxide.

References Cited
UNITED STATES PATENTS

| | | | |
|---|---|---|---|
| 2,823,218 | 2/1958 | Speier et al. | 260—448.8X |
| 3,187,032 | 6/1965 | Weyenberg | 260—448.2 |
| 3,334,123 | 8/1967 | Culpepper | 260—448.8 |
| 3,388,144 | 6/1968 | Musolf et al. | 260—448.8 |
| 3,395,164 | 7/1968 | Leebrick | 260—429.7 |
| 3,440,302 | 4/1969 | Speier et al. | 260—448.8X |

TOBIAS E. LEVOW, Primary Examiner

W. F. BELLAMY, Assistant Examiner

U.S. Cl. X.R.

260—448.2, 429.7